US008643777B2

(12) United States Patent
Wallace et al.

(10) Patent No.: US 8,643,777 B2
(45) Date of Patent: Feb. 4, 2014

(54) PIXEL INTERPOLATION WITH EDGE DETECTION BASED ON CROSS-CORRELATION

(75) Inventors: Bradley Arthur Wallace, Austin, TX (US); James Ward Girardeau, Jr., Austin, TX (US)

(73) Assignee: VIXS Systems Inc., Toronto, Ontario (CA)

(*) Notice: Subject to any disclaimer, the term of this patent is extended or adjusted under 35 U.S.C. 154(b) by 891 days.

(21) Appl. No.: 12/567,128

(22) Filed: Sep. 25, 2009

(65) Prior Publication Data

US 2011/0075026 A1    Mar. 31, 2011

(51) Int. Cl.
*H04N 7/01* (2006.01)
*H04N 11/20* (2006.01)

(52) U.S. Cl.
USPC ........... 348/448; 348/441; 348/452; 348/458; 348/607; 348/700; 348/625; 348/630; 348/459; 382/300; 382/263; 382/266; 382/261; 382/199; 382/264

(58) Field of Classification Search
USPC ......... 348/448, 441, 452, 458, 459, 607, 625, 348/630, 700; 382/199, 261, 263, 264, 266, 382/300
See application file for complete search history.

(56) References Cited

U.S. PATENT DOCUMENTS

| 4,736,448 | A | * | 4/1988 | Umemura | 382/260 |
| 5,886,745 | A | * | 3/1999 | Muraji et al. | 348/448 |
| 6,262,773 | B1 | * | 7/2001 | Westerman | 348/448 |
| 6,396,543 | B1 | * | 5/2002 | Shin et al. | 348/452 |
| 6,614,485 | B2 | * | 9/2003 | Shin et al. | 348/452 |
| 6,628,330 | B1 | * | 9/2003 | Lin | 348/252 |
| 6,731,342 | B2 | * | 5/2004 | Shin et al. | 348/452 |
| 6,810,156 | B1 | * | 10/2004 | Itoh | 382/300 |
| 7,023,487 | B1 | | 4/2006 | Adams | |
| 7,126,643 | B2 | | 10/2006 | Song et al. | |
| 7,161,602 | B2 | | 1/2007 | Shan | |

(Continued)

FOREIGN PATENT DOCUMENTS

WO    2007075885 A2    7/2007

OTHER PUBLICATIONS

M. Zhao et al., "Subjective evaluation of de-interlacing techniques," Proceedings of the SPIE, vol. 5685, pp. 683-691, Apr. 6, 2005.

(Continued)

*Primary Examiner* — Jefferey Harold
*Assistant Examiner* — Mustafizur Rahman

(57) ABSTRACT

A pixel interpolation process is based on detection of a potential edge in proximity to a pixel being estimated, and the angle thereof. The potential edge and its angle is determined based on filtering of offset or overlapping sets of lines from a pixel window centered around the pixel being estimated and then cross-correlating the filter results. The highest value in the correlation result values represents a potential edge in proximity to the pixel being estimated and the index of the highest value represents the angle of the potential edge. This information is used in conjunction with other information from the cross-correlation and analysis of the differences between pixels in proximity to verify the validity of the potential edge. If determined to be valid, a diagonal interpolation based on the edge and its angle is used to estimate the pixel value of the pixel. Otherwise, an alternate interpolation process, such as vertical interpolation, is used to estimate the pixel value for the pixel.

20 Claims, 4 Drawing Sheets

(56) References Cited

U.S. PATENT DOCUMENTS

| | | | |
|---|---|---|---|
| 7,362,378 B2 | 4/2008 | Orlick | |
| 7,391,476 B2* | 6/2008 | Hahn | 348/625 |
| 7,414,671 B1* | 8/2008 | Gallagher et al. | 348/625 |
| 7,423,691 B2* | 9/2008 | Orlick et al. | 348/448 |
| 7,538,824 B1* | 5/2009 | Pillay et al. | 348/701 |
| 7,586,540 B2* | 9/2009 | Ogino et al. | 348/448 |
| 2001/0008425 A1* | 7/2001 | Shin et al. | 348/452 |
| 2001/0015768 A1* | 8/2001 | Shin et al. | 348/452 |
| 2003/0206667 A1 | 11/2003 | Wang et al. | |
| 2004/0119884 A1* | 6/2004 | Jiang | 348/448 |
| 2004/0227851 A1* | 11/2004 | Min | 348/441 |
| 2005/0036062 A1 | 2/2005 | Kang et al. | |
| 2005/0105647 A1* | 5/2005 | Wilhelmsson et al. | 375/316 |
| 2006/0146187 A1* | 7/2006 | Handjojo et al. | 348/448 |
| 2007/0052845 A1* | 3/2007 | Adams | 348/452 |
| 2007/0098222 A1* | 5/2007 | Porter et al. | 382/103 |
| 2008/0024658 A1* | 1/2008 | Wang et al. | 348/448 |
| 2008/0031538 A1* | 2/2008 | Jiang et al. | 382/261 |
| 2008/0165277 A1 | 7/2008 | Loubachevskaia et al. | |
| 2009/0244365 A1* | 10/2009 | Takeda et al. | 348/441 |

OTHER PUBLICATIONS

Gerard De Haan et al., "Deinterlacing—An Overview," Proceedings of the IEEE, vol. 86, No. 9, Sep. 1998, pp. 1839-1857.

* cited by examiner

PIXEL INTERPOLATION WITH EDGE DETECTION BASED ON CROSS-CORRELATION

FIELD OF THE DISCLOSURE

The present disclosure relates generally to video processing and more particularly to video deinterlacing or video upscaling.

BACKGROUND

Video systems often estimate pixel values for pixels that are not available in the original video data, such as when converting interlaced video to deinterlaced video or when upscaling video to a higher resolution. Conventional techniques for estimating a pixel value for a missing pixel typically rely on some form of interpolation between lines above and below the line on which the missing pixel will be located. Often, such interpolation processes utilize edge detection to identify whether a pixel value being estimated lies along an edge in the content of the frame, and interpolate for the pixel value accordingly. However, many of these edge-dependent interpolation processes fail to account for the direction of the edge, which can lead to significant interpolation errors and thus introduce undesirable visual artifacts, and those conventional interpolation techniques that do account for the direction of the edge often require considerable processing effort to do so, such as requiring analysis over many successive fields. Moreover, conventional edge-dependent interpolation techniques fail to properly evaluate the validity of the detected edge, thereby frequently calculating incorrect pixel values based on a falsely-detected edge.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate exemplary techniques for pixel interpolation in a video processing device. The pixel interpolation is based on detection of a potential edge in proximity to a pixel being estimated, and the angle thereof, based on filtering (vertical high-pass/horizontal low-pass) of offset or overlapping sets of lines from a pixel window centered around the pixel being estimated and then cross-correlating the filter results. The highest value in the correlation result values represents a potential edge in proximity to the pixel being estimated and the index of the highest value within the correlation result values represents the angle of the potential edge. This information is used in conjunction with other information from the cross-correlation and analysis of the differences between pixels in proximity to the pixel being estimated to verify the validity of the potential edge (i.e., whether the potential edge is a true edge). If the potential edge is determined to be valid, the video processing device uses diagonal interpolation based on the edge and its angle to estimate the pixel value of the pixel. Otherwise, if the potential edge is determined to be invalid, the video processing device uses an alternate interpolation process to estimate the pixel value for the pixel, such as a vertical interpolation between pixels above and below the pixel being estimated. The video processing device implementing these techniques can include a deinterlacer and the pixel interpolation therefore can be for the purposes of interpolating the pixels of one field based on the pixel data of another field to create a video frame. Alternately, the video processing device can include a video scaler and the pixel interpolation therefore may be for the purposes of upscaling an original video frame to generate an upscaled video frame.

Figure 1:
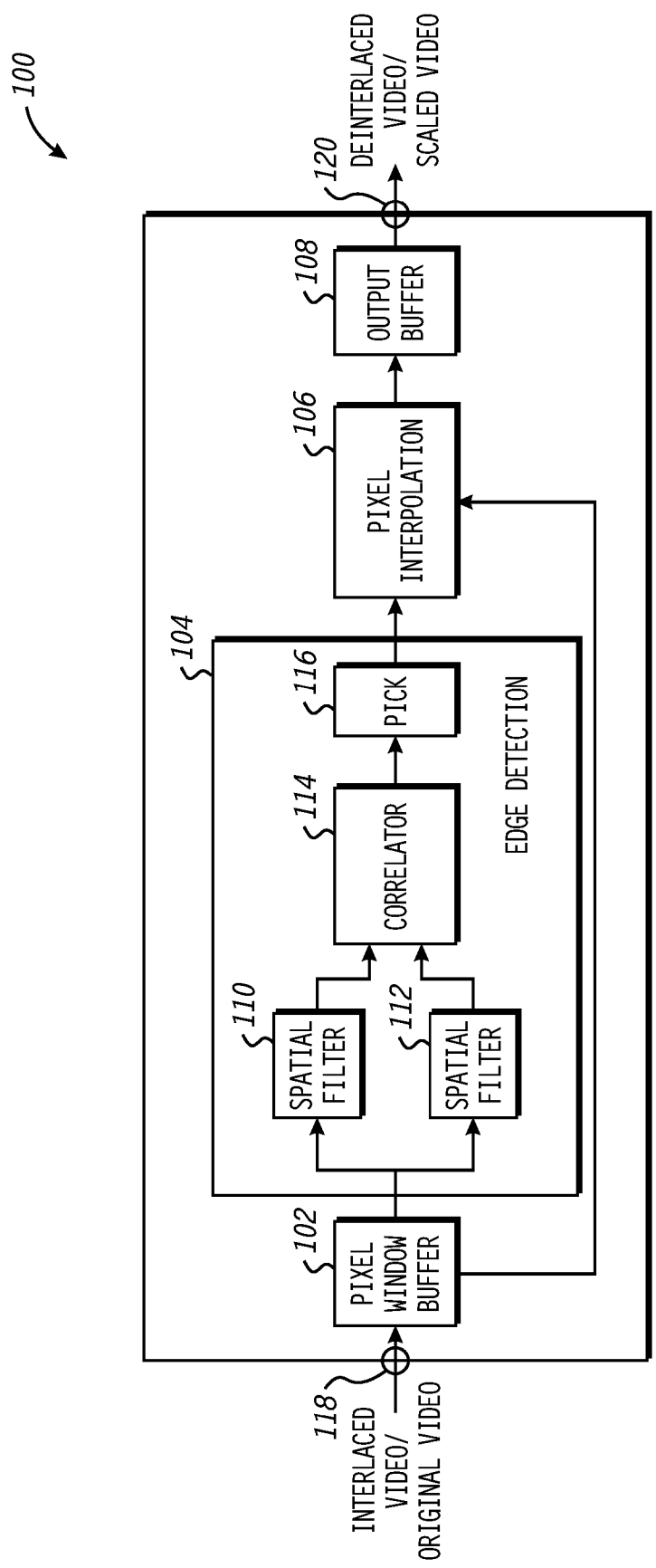
FIG. 1 is a block diagram illustrating a video processing device that implements edge-dependent pixel interpolation via cross-correlation in accordance with at least one embodiment of the present disclosure.
Figure 2:
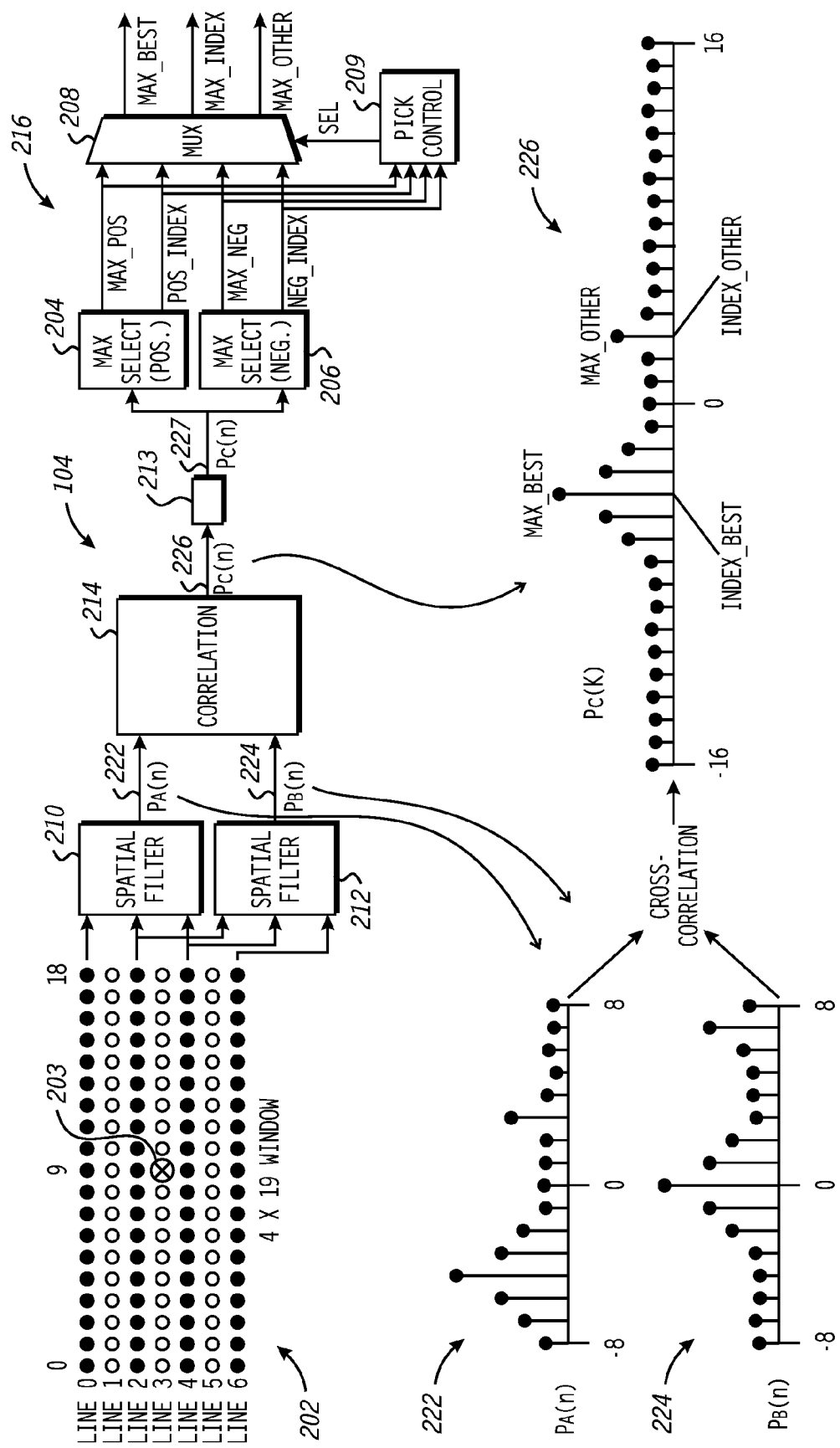
FIG. 2 is a diagram illustrating an example implementation of an edge detection module of the video processing device of FIG. 1 in accordance with at least one embodiment of the present disclosure.
Figure 3:
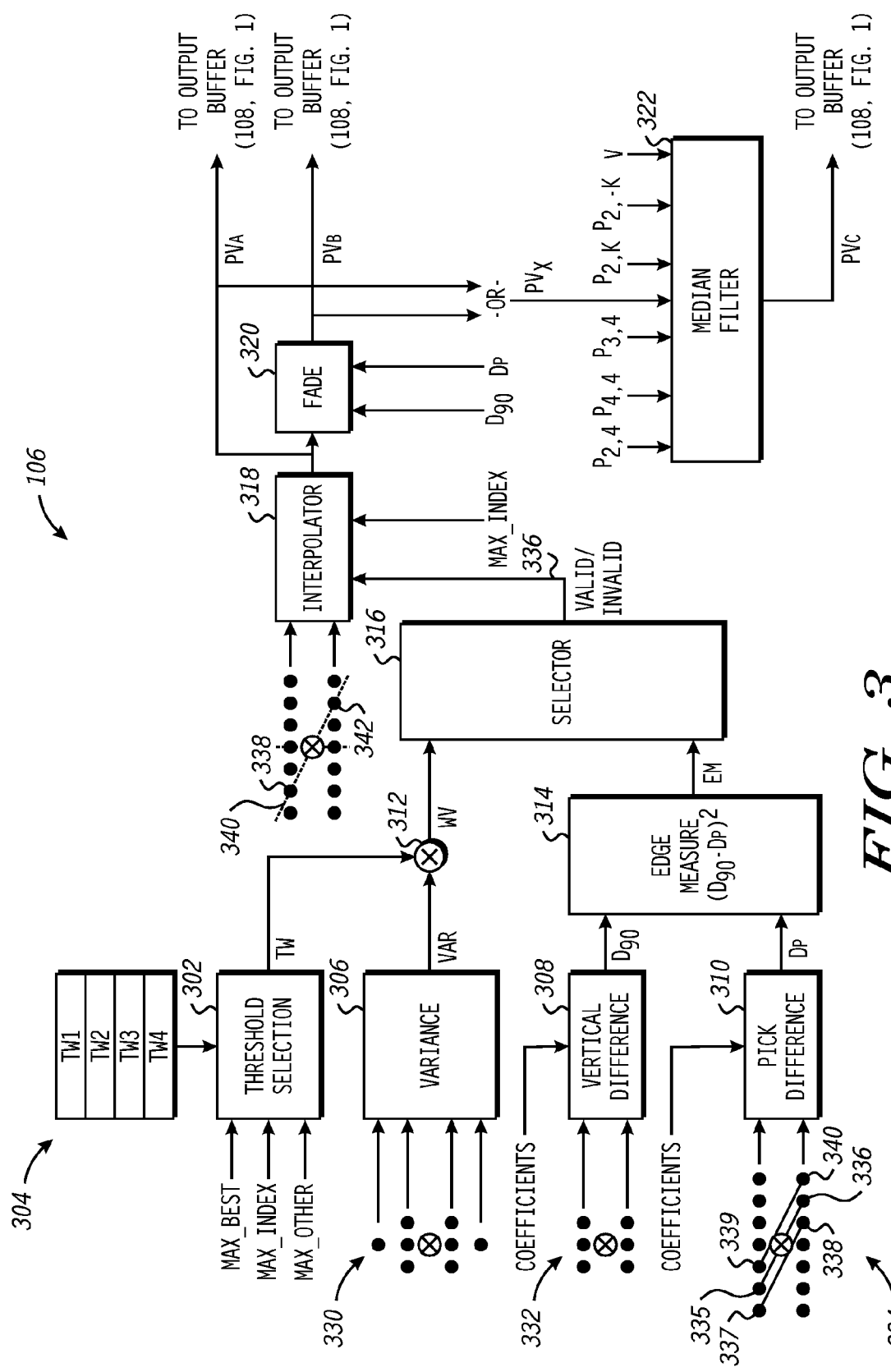
FIG. 3 is a diagram illustrating an example implementation of a pixel interpolation module of the video processing device of FIG. 1 in accordance with at least one embodiment of the present disclosure.

FIG. 1 illustrates a video processing device 100 in accordance with at least one embodiment of the present disclosure. The video processing device 100 includes a pixel window buffer 102, an edge detection module 104, a pixel interpolation module 106, and an output buffer 108. The edge detection module 104 includes a spatial filter module 110, a spatial filter module 112, a correlator module 114, and a pick module 116. The functionality of the various modules of the video processing device 110 as illustrated in FIGS. 1-3 can be implemented as hardware, firmware, one or more processors and software, or a combination thereof. To illustrate, the functionality of certain components can be implemented as discrete logic, an application specific integrated circuit (ASIC), a field programmable gate array (FPGA), and the like, while other functions of certain components can be implemented as software instructions executed by one or more processors of a processing system. Further, some or all of the components can implemented in a processing device designed based on a set of register-transfer-level (RTL) or Verilog instructions that define the functionality of the processing device and which are synthesized to generate the electrical and electronic design of the processing device.

In operation, the video processing device 100 receives input video data via an input 118 and the pixel window buffer 102 buffers pixel data for pixels of a plurality of lines of the input video data. The input video data may include an interlaced field for an implementation of the video processing device 100 as a deinterlacer or an original frame of video for an implementation of the video processing device 100 as a video scaler. The pixel data may be provided or obtained from any of a variety of sources, such as a frame buffer at the output of a video decoder. The lines of the pixel window are centered around or otherwise encompass the estimated pixel. In the case of a deinterlacing application, the plurality of lines of the pixel window buffer 102 includes lines from the field other than the field of the estimated pixel. To illustrate, if the estimated pixel is from an even field, the pixel window buffered in the pixel window buffer 102 is composed of the lines of a temporally-proximate odd field that would be centered around the estimated pixel as though the even field and the odd field were combined into a single frame. In the case of an upsampling application, the plurality of lines of the pixel window are composed of adjacent lines of an original video frame and the pixel being estimated is for a line to be inserted between two lines from the original video frame so as to upscale the original video image to an upscaled video image.

The spatial filter module 110 is configured to apply a filter matrix to the pixel values of one set of lines of the pixel window to generate one set of filter results and the spatial filter module 112 is configured to apply the filter matrix to the pixel values of another set of lines of the pixel window (whereby the two sets are offset or overlap by at least one line) to generate another set of filter results. The filter matrix is configured so as to provide high-pass filtering in the vertical direction so as to obtain edge information and to provide low-pass filtering in the horizontal direction so as to filter out noise. The correlator module 114 cross-correlates the two sets of filter results to generate a set of correlation result values and the pick module 116 identifies an angle of a potential edge in proximity to the estimated pixel based on the correlation result values of the correlator module 114. The pixel interpolation module 106 then uses the angle of the potential edge indicated by the pick module 116, as well as other information determined from the correlation result values and other analyses of pixel values from the pixel window to determine whether to calculate the pixel value of the estimated pixel based on a diagonal interpolation using the angle of the potential edge or to use an alternate interpolation process independent of the angle, such as a direct vertical interpolation. After estimating the pixel value via the selected interpolation method, the pixel value for the estimated pixel is buffered in the output buffer 108 (which may include, for example, a frame buffer). The original pixel data and the estimated pixel values generated by the video processing device 100 then may be provided via an output 120 as output video data to another video processing device (e.g., a display controller, an encoder, etc.) as deinterlaced video (for a deinterlacing application) or as upscaled video (for an upscaling application).

FIG. 2 illustrates an example implementation of the edge detection module 104 of the video processing device 100 of FIG. 1 in accordance with at least one embodiment of the present disclosure. As illustrated, the edge detection module 104 includes spatial filter modules 210 and 212 (corresponding to the spatial filter modules 110 and 112, FIG. 1), a correlation weighting module 213, a correlation module 214 (corresponding to the correlation module 114, FIG. 1), and a pick module 216 (corresponding to the pick module 116, FIG. 1). The pick module 216 includes a max positive select module 204, a max negative select module 206, a multiplexer (MUX) 208, and a pick control module 209.

In the depicted example, the pixel window buffer 102 (FIG. 1) buffers a pixel window 202 composed of four (4) adjacent lines, each line having nineteen (19) pixel values. Those pixels having pixel values included in the pixel window 202 are represented in FIG. 2 as filled circles, and those pixels to be estimated or those pixels that have been estimated are represented in FIG. 2 as unfilled circles. Further, the pixel to be estimated in the processes described below (estimated pixel 203) is depicted in the pixel window 202 as a larger circle with an "X" located in the center of the circle. To illustrate, the estimated pixel 203 could be located at line 3 of an even field, and thus the lines in the pixel window 202 can include the lines of an associated odd field that would encompass, or be centered around, the estimated pixel 203 at line 3 (e.g., lines 0, 2, 4, and 6) for a deinterlacing application. Although the pixel window 202 is illustrated as a 4×19 pixel window, different size pixel windows may be used without departing from the scope of the present disclosure. To illustrate, while a width of nineteen pixels has been found to be sufficient for estimating the angle of a potential edge to a satisfactory degree, a wider pixel window may be used to increase the angle resolution, or a narrower window may be used to reduce the computational effort. Likewise, in the illustrated example, the spatial filters 110 and 112 employ two 3-tap vertical filters (with example coefficients of $\{-1, 2, -1\}$), thereby resulting in the use of four lines for the filtering process. However, while 3-tap filters are illustrated in view of hardware efficiency, filters with more taps can be used in accordance with the scope of the present disclosure. To illustrate, a larger order filter response can be implemented with, for example, a 5-tap filter, which would then result in the use of six lines in the pixel window 202 for the filtering process.

As the pixel window 202 includes four lines (e.g., lines 0, 2, 4, and 6) in the illustrated example, the pixel window 202 can be logically partitioned into two sets of lines that are offset by one line (and overlap by two lines): a first set composed of lines 0, 2, and 4; and a second set composed of lines 2, 4, and 6. In this example, the spatial filter module 210 applies a filter matrix to the first set to generate a set 222 of filter results (also identified herein as filter results $P_A()$) and the spatial filter MODULE 212 applies a filter matrix to the second set to generate a set 224 of filter results (also identified herein as filter results $P_B()$). The applied filter matrix selected or configured to high-pass filter in the vertical direction so as to identify high-frequency edges. The filter matrix further takes the results of the high-pass filtering and applies a low-pass filter to reduce noise. To illustrate, the filter matrix can employ the coefficients $\{-1, 2, -1\}$ as an approximation of a second-derivative operator, and thus the filter matrix can take the form of:

$$H = \begin{bmatrix} -1 \\ 2 \\ -1 \end{bmatrix} \begin{bmatrix} 1 & 1 & 1 \end{bmatrix} \begin{bmatrix} -1 & -1 & -1 \\ 2 & 2 & 2 \\ -1 & -1 & -1 \end{bmatrix}$$

where H represents the filter matrix applied by the spatial filter modules 210 and 212. In this example, the second-derivative operator will provide a zero-crossing in the center of an edge, if any, and the low-pass filtering aspect takes three adjacent high-pass results and averages them. Thus, each of the two spatial filters 110 and 112 generate edge profiles that the correlation module 214 attempts to match, as described below. Although an example filter matrix is described above, the present disclosure is not limited to this example, but rather any of a variety of filter matrix configurations advantageous for edge detection.

As illustrated in FIG. 2, the application of the filter matrix to the first three lines of 19 pixels from the pixel window 202 and to the overlapping last three lines of 19 pixels from the pixel window 202 results in sets 222 and 224, respectively, each having seventeen (17) filter result values, which are indexed in this example from −8 to 8. Note that although FIG. 2 depicts sets 222 and 224 with only positive filter result values for ease of illustration, a filter result value also may be negative depending on the particular pixel values in the pixel window 202 and the values implemented in the filter matrix. The correlator module 214 then cross-correlates sets 222 and 224 to generate a set 226 of correlation result values (also identified herein as correlation result values $P_C(n)$). Any of a variety of cross-correlation techniques may be implemented by the correlator module 214. To illustrate, in one embodiment, the cross-correlation technique implemented by the correlator module 214 is represented by the function:

$$P_C(n) = \begin{cases} \sum_k P_A(k) * P_B(n+k); & n \text{ even} \\ -\infty; & \text{otherwise} \end{cases}$$

As illustrated by the above function, the odd set of Pc(n) are set to —infinity for ease of implementation. This approach limits the potential angle so four positive and four negative angles, and thus reduces the number of multiply and add operations. However, in other embodiments the odd set can be calculated in the same manner as the even set so as to provide a finer resolution for the angle determination process. In the example of FIG. 2, the cross-correlation of the sets 222 and 224 (each having seventeen filter result values) results in the set 226 of correlation result values having thirty-three (33) values, indexed in the example of FIG. 2 from −16 to 16 (noting that the odd-indexed values of—infinity are not depicted in FIG. 2).

The application of the filter matrix to each set of lines in the pixel window 202 has the effect of identifying changes in the contrast within the corresponding sets of pixels, and thus indicative of a possible edge in the corresponding set of pixels. The cross-correlation of the sets 222 and 224 generated by the applications of the filter matrix to these sets of lines thus has the effect of comparing the two sets of pixels to indicate whether the same potential edge runs through both sets of lines in proximity to the estimated pixel, and if so, the angle of the potential edge. The potential edge within a pixel window thus is identified as the highest correlation result value in the set 226 of correlation result values, and the index of this highest correlation result value represents the angle of the potential edge. To illustrate, the cross-correlation of the values of the illustrated sets 222 and 224 can result in the values of the illustrated set 226 of correlation result values, whereby the highest correlation result value is located at a position indexed as −4, and thus the angle of the potential edge can be identified as:

$$\theta = a\tan\left(\frac{y}{2}\right) * \frac{180}{\pi}$$

where θ represents the angle of the potential edge and y represents the index of the highest correlation result value in the set 226.

Further, in one embodiment, the set 226 of correlation result values is weighted by the weighting module 213 to generate a weighted set 227 of correlation result values ($P_c'(n)$) so as to emphasize the correlation result values representative of steeper angles over those representative of narrow angles. In one embodiment, the weighting module 213 accomplishes this weighting by using a set of weight values corresponding to the position of the correlation result values (e.g., a different weight value corresponding to each position between −16 and +16), whereby the weight values increase as they approach the center of the set 226 (i.e., as the corresponding position approaches 0).

While the highest correlation result value may represent a potential edge, it also may simply be a result of noise or some other artifact. Accordingly, as discussed in greater detail below, the relative magnitude of the next highest correlation result value in the other half of the weighted set 227 of correlation result values may be used as an indicator of the likelihood that the potential edge is a true edge. To facilitate identification of the highest overall correlation result value and the next-highest correlation result value in the other half of the weighted set 227 of correlation result values, the correlation result values of a first half of the weighted set 227 of correlation result values (e.g., the correlation result values at indices −16 to −1, or at indices 0 to 16 for an indexing from 0 to 32) are provided to the max negative select module 206, which identifies the highest correlation result value of the first half and its index as values max_neg and neg_index, respectively. The correlation result values of the second half of the set 226 (e.g., the correlation result values at indices 0 to 16, or at indices 17 to 32 for an indexing from 0 to 32) are provided to the max positive select module 206, which identifies the highest correlation result value of the second half and its index as values max_pos and pos_index, respectively. The pick control 209 determines the highest value between max_pos and max_neg and directs the MUX 208 via signaling SEL to provide the identified highest value of values max_pos and max_neg as the value max_best and its index as value max_index, as well as to provide the other value as max_other (and its index as value other_index). Thus, the value max_ best identifies the highest overall correlation result value in the weighted set 227, the value max_index identifies its index, or position, within the weighted set 227, the value max_other identifies the highest correlation result value in the half of the weighted set 227 in that does not include highest overall correlation result for the weighted set 227 and the value other_index identifies its index, or position, within the weighted set 227. The values max_best, max_index, and max_other then are provided to the pixel interpolation module 106 for use in determining whether the potential edge represented by the value max_best is a valid edge, and thus whether to use a diagonal interpolation process based on an angle of the valid edge as represented by the value max_index or another interpolation process that does not rely on the potential edge. Alternately, rather than weighting the correlation results and using the weighted set 227, the unweighted set 226 of correlation result values may be used in the process described above.

FIG. 3 illustrates an example implementation of the pixel interpolation module 106 of the video processing device 100 of FIG. 1 in accordance with at least one embodiment of the present disclosure. In the depicted example, the pixel interpolation module 106 includes a threshold selector module 302, a weighting value data store 304, a variance module 306, a vertical difference module 308, a pick difference module 310, an edge measure module 314, a selector module 316, and an interpolator module 318. The pixel interpolation module 106 further can include a fade module 320 and a median filter module 322.

In operation, the pixel interpolation module 106 determines whether the potential edge determined by the edge detection module 104 (FIG. 1) is a valid edge and, based on the validity or the invalidity of the potential edge, selects either a diagonal interpolation process based on the angle of the detected potential edge or an alternate interpolation process that is independent of the potential edge. In one embodiment, the pixel interpolation module 106 determines the validity of the potential edge via analyses and comparisons of the various differences between pixel values in proximity to the estimated pixel, whereby one or more of these differences is weighted or otherwise adjusted based on a threshold weight value determined based on the values max_best, max_index, and max_other determined by the edge detection module 104 as described above.

In one embodiment, the differences between pixels in proximity to the estimated pixel include a variance Var, a vertical difference $D_{90}$, and a pick difference $D_P$ (i.e., a diagonal difference). Accordingly, the variance module 306 calculates the variance Var (as a statistical variance or as a mean squared error) between a set of pixels of the pixel window 202 that are in proximity to the estimated pixel. For example, the variance can be calculated for a set 330 composed of three pixels from the line above the estimated pixel, three pixels from the line below the estimated pixel, the pixel directly above the estimated pixel in the second line above the estimated pixel, and the pixel directly below the estimated pixel in the second line below the estimated pixel, as illustrated in FIG. 3. It will be appreciated that the variance Var is a measurement of the difference among the pixels in proximity to the estimated pixel. As such, if the variance is small, the region around the estimated pixel is relatively smooth and thus a diagonal interpolation is less likely to produce a spurious result. Conversely, if the variance is large, there could be a sharp edge in the region of interest, and thus diagonal interpolation becomes more risky. To illustrate, a black line on a white background would result in a large variance. If two black values are not used in the interpolation process, the interpolated result will be incorrect and highly noticeable upon display (e.g., interpolating between black and white values would result in a visually distinct grey pixel value). However, a darker grey line on a lighter grey background would result in a smaller variance. Even if a dark grey value and a light grey value were incorrectly used in the interpolation process, the resulting interpolated pixel value would still be a shade of gray and thus less visually distinct from either the darker grey line or the lighter grey background.

Ideally, the vertical difference module 308 calculates the difference between pixels along a line that is perpendicular to the potential edge. However, the size of the pixel window 202 (FIG. 2) often does not provide sufficient dimensions to identify pixels that are adequately aligned with the perpendicular line. In such instances, the vertical difference module 308 instead calculates a vertical difference $D_{90}$ between pixels below and above the estimated pixel, such as, e.g., the vertical difference in a set 332 between three pixels above the estimated pixel and the corresponding three pixels below the estimated pixel. In one embodiment, the vertical difference $D_{90}$ is calculated as a weighted average of the vertical differences, whereby the weighting coefficients can be programmed or otherwise set by a user, manufacturer, provider, and the like. To illustrate using the set 332 of FIG. 3, the vertical difference $D_{90}$ can be calculated as:

$$D_{90} = (coef\ 1*(pal-pbl) + coef\ 2*(pad-pbd) + coef\ 3*(par-pbr))/3$$

where pal and pbl represent the pixels to the left of the estimated pixel in the line above and the line below, respectively, the estimated pixel, pad and pbd represent the pixels directly above and directly below, respectively, the estimated pixel, and par and pbr represent the pixels to the right of the estimated pixel in the line above and the line below, respectively, the estimated pixel. In this case, the vertical difference between the pixels directly above and below the estimated pixel typically is given greater weighting than the vertical differences between the pixels to the right and to the left of the estimated pixel (e.g., for a total weighting of 1, coef 1=coef 3=0.25 and coef 2=0.5). It will be appreciated that the vertical difference $D_{90}$ indicates the variation between pixels on one side of the potential edge and pixels on the other side of the potential edge. As such, a larger value for the vertical difference $D_{90}$ is more indicative of the validity of the potential edge, and vice versa.

The pick difference module 310 calculates the pick, or diagonal, difference $D_P$ between pixels of the pixel window 202 in accordance with the angle of the potential edge. To calculate the diagonal difference, the pick difference module 310 calculates a weighted sum of differences of two pixels along a line through the estimated pixel and differences of two pixels along one or more other lines parallel to this line. To illustrate, in the set 334 of pixels from the pixel window 202, the pick difference 310 determines the difference between pixels 335 and 336 along a line through the estimated pixel having the same angle as the potential edge, the difference between pixels 337 and 338 along a parallel line to the left of the estimated pixel, and the difference between pixels 339 and 340 along a parallel line to the right of the estimated pixel. The pick difference module 310 then calculates the pick difference $D_P$ as a weighted average of these differences in a manner similar to the process described above for calculating the vertical difference $D_{90}$ using the same weighting coefficients or different weighting coefficients. It will be appreciated that the pick difference $D_P$ indicates the variation between pixels along the potential edge. As such, a smaller value for the pick difference $D_P$ is more indicative of the validity of the potential edge, and vice versa.

In one embodiment, a threshold weight value TW is determined based on the correlation result values and then used to weight one or more of the variance Var, the vertical difference $D_{90}$, or the pick difference $D_P$. The threshold weight datastore 304 (e.g., a register file, a cache, a memory, etc.) can be programmed or otherwise configured to store a plurality of threshold weight values between 0 to 1, such as, e.g., four threshold weight values TW1, TW2, TW3, and TW4, as well as a null threshold weight value (0). The threshold selection module 302 receives the values max_best, max_index, and max_other and selects one of the plurality of threshold weight values for output as the threshold weight value TW. The selection process employed by the threshold selection module 302 can be represented by the following algorithm of Table 1 for the example 4×19 pixel window context described above:

TABLE 1 algorithm for weight selection process

```
max_other_neg_only2 {set by manufacturer; typically 0}
max_other_neg_only4 {set by manufacturer; typically 0}
max_other_neg_only6 {set by manufacturer; typically 0}
max_other_neg_only8 {set by manufacturer; typically 0}
    if(max_best > 0)
    {
        if(abs(max_index) <= 2)
        {
            if(max_other > 0 && max_other_neg_only2)
                TW = 1e6;        // set threshold weight value TW very high to indicate invalid edge
            else
```

TABLE 1-continued algorithm for weight selection process

```
            TW = TW1;                 // select TW1 as threshold weight value TW
        }
        else if(abs(max_index) <= 4)
        {
            if(max_other > 0 && max_other_neg_only4)
                TW = 1e6;             // set threshold weight value TW very high to indicate invalid edge
            else
                TW = TW2;             // select TW2 as threshold weight value TW
        }
        else if(abs(max_index) <= 6)
        {
            if(max_other > 0 && max_other_neg_only6)
                TW = 1e6;             // set threshold weight value TW very high to indicate invalid edge
            else
                TW = TW3;             // select TW3 as threshold weight value TW
        }
        else if(abs(max_index) <= 8)
        {
            if(max_other > 0 && max_other_neg_only8)
                TW=1e6;
            else
                TW = TW4;             // select TW4 as threshold weight value TW
        }
        else
        {
            TW = 1e6;                 // set threshold weight value TW very high to indicate invalid edge
        }
    }
    else
    {
        TW = 1e6;                     // set threshold weight value TW very high to indicate invalid edge
    }
```

As illustrated by the algorithm of Table 1, if the value max_best (representing the highest correlation result value) is less than or equal to zero, there is no correlation between the two sets of lines, and thus no valid edge. Accordingly, the threshold weight value TW is set to a very high value (e.g., $1 \times 10^6$) to ensure that an alternate interpolation process is selected by the interpolator module 318 for the estimated pixel. Further, if the value max_other is greater than 0 (thereby indicating some correlation in the opposite direction), and the angle represented by the value other_index is 14 degrees, the threshold weight value TW also is set to the very high value (meaning that the 14 degree angle is cautious in diagonal picks). Otherwise, if the value max_other is greater than 0 and the angle represented by the value other_index is 45, 26.6, or 18.4, the threshold weight value TW is selected from one of the four programmed threshold weight values TW1, TW2, TW3, and TW4 (which, in this example, increase in value) based on the angle/index (max_index) of the potential edge. Accordingly, the threshold weight selection process described above has the effect of selecting a greater value for the threshold weight value TW as the angle of the potential edge increases. As such, a smaller angle indicated by the value max_index results in a smaller value for the threshold weight value TW, thereby resulting in a more conservative approach to validating the potential edge.

The threshold weight value TW, once selected by the threshold selection module 302, is used to weight one or more of the variance Var, the vertical difference $D_{90}$, or the pick difference $D_P$. In the example of FIG. 3, the threshold weight value TW is used to weight the variance Var via a weighting module 312 (e.g., a multiplier) to generate a weighted variance WV (WV=TW*Var). The edge measure module 314 then calculates an edge measure value EM that represents a measure of the validity of the potential edge based on a difference between the vertical difference $D_{90}$ and the pick difference $D_P$, such as by calculating the square of the difference using the following equation:

$$EM=(D_{90}-D_P)^2$$

For a valid edge proximate to the estimated pixel, the vertical difference $D_{90}$ would be relatively large and the pick difference $D_P$ would be relatively small or even zero.

The selector module 316 receives the weighted variance WV and the edge measure value EM and determines whether the potential edge is valid based on a comparison of these two values. In the event that the edge measure value EM is greater than or equal to the weighted variance WV, the selector module 316 identifies the potential edge as valid and configures a signal 336 to reflect the valid status of the potential edge. Otherwise, in the event that the weighted variance WV is greater than the edge measure value EM, the selector module 316 identifies the potential edge as invalid and configures the signal 336 to reflect the invalid status of the potential edge.

The interpolator module 318 receives the signal 336 from the selector module 316 and selects an interpolation process for determining the pixel value of the estimated pixel based on the validity of the potential edge indicated by the signal 336. In response to the signal 336 indicating that the potential edge is valid, the interpolator module 318 implements a diagonal interpolation process based on the angle of the potential edge (represented by the value max_index) to calculate the pixel value of the estimated pixel. To illustrate, the interpolator module 318 can interpolate the pixel value of the estimated pixel from the pixel 338 located along a potential edge 340 in the line above the estimated pixel and the pixel 342 located along the potential edge 340 in the line below the estimated pixel. Other diagonal interpolation calculations using the angle of the potential edge also may be used. However, in response to the signal 336 indicating that the potential edge is invalid, the interpolator module 318 uses an alternate interpolation process that does not rely on the potential edge or its angle, such as, e.g., a vertical interpolation between the pixel immediately above the estimated pixel and the pixel immediately below the estimated pixel.

In one embodiment, the resulting interpolated pixel value $PV_A$ (either from the diagonal interpolation process or an alternate interpolation process) is output to the output buffer 108 as the final pixel value for the estimated pixel. However, in certain instances, additional processing of the interpolated pixel value $PV_A$ may be appropriate before the final pixel value is reached. In one embodiment, the fade module 320 calculates the processed pixel value $PV_B$ using interpolated pixel value $PV_A$, the vertical difference value $D_{90}$, and the pick difference value $D_P$. To illustrate, the fade module 320 can use the following equations to determine the processed pixel value $PV_B$:

$$k = 0.5 * \frac{D_P}{2 * D_{90}}$$

$$PV_B = (1-k) * PV_A + k * y\_linear\_avg$$

where y_linear_avg represents the average of the pixel values of the pixels directly above and directly below the pixel to be interpolated.

Rather than directly output the interpolated pixel value $PV_A$ or the processed pixel value $PV_B$ derived from the interpolated pixel value $PV_A$ as the final pixel value for the estimated pixel, additional protective schemes may be implemented using one or both of these pixel values to further protect against the use of a pixel value for the estimated pixel that is determined based an erroneous evaluation of a potential edge as valid. As one technique for further validating the potential edge, one or both of the interpolated pixel value $PV_A$ or the processed pixel value $PV_B$ can be input into the median filter module 322 along with one or more other values that represent alternate potential pixel values for the estimated pixel, whereby the median filter module 322 selects the median values of these plurality of input values as the median pixel value $PV_C$, which then may be provided to the output buffer 108 as the final pixel value for the estimated pixel, or which may be subjected to further processing for determining the final pixel value for the estimated pixel. This grouping of the interpolated pixel value $PV_A$ (or a representation thereof) without other pixel values that potentially represent the estimated pixel and then selecting the pixel value of the estimated pixel as the median of this group acts as a final evaluation of the validity of the potential edge. If the interpolated pixel value $PV_A$ is far from the median value (i.e., an outlier) of the potential values for the estimated pixel, it was most likely an incorrect interpolation and thus should not have been used as the final pixel value for the estimated pixel regardless. Conversely, the greater the number of potential values that are close to the interpolated pixel value PVA, the more likely the potential edge was correctly judged as valid, and thus the more likely the interpolated pixel value $PV_A$ or another potential pixel value close in value to the interpolated pixel value $PV_A$ will be the median value of the group and thus selected as the final pixel value for the estimated pixel.

Any of a variety of potential pixel values for the estimated pixel value can be input to the median filter 332. To illustrate, in addition to one or both of the interpolated pixel value $PV_A$ or the processed pixel value $PV_B$, the input pixels can include: the pixel value of the pixel immediately above the estimated pixel ($P_{2,4}$); the pixel value of the pixel immediately below the estimated pixel ($P_{4,4}$); the pixel value of the pixel in the same position as the estimated pixel from an earlier or later frame or field ($P_{3,4}$); the pixel value of the pixel along the potential edge in the line above the estimated pixel ($P_{2,k}$); the pixel value of the pixel along the potential edge in the line below the estimated pixel ($P_{2,-k}$); and a value V representing a spatial/temporal relationship calculated using, for example, the equation:

$$v = \frac{1}{2}(P_{2,4} + P_{4,4}) + \frac{1}{2}\left(\frac{1}{2}P_{3,4} - \frac{1}{4}(P_{1,4} + P_{5,4})\right)$$

where $P_{1,4}$ represents the pixel value of the pixel two lines above the estimated pixel from an earlier or a later frame or field, and $P_{5,4}$ represents the pixel value of the pixel two lines below the estimated pixel from an earlier or a later frame or field.

As described above, the edge detection module 104 identifies a potential edge in proximity to the estimated pixel using cross-correlation of the results of filtering offset sets of lines of a pixel window 202 and the pixel interpolation module 106 can use the angle of the potential edge to diagonally interpolate a pixel value for the estimated pixel. However, in at least on embodiment, the pixel interpolation module 160 uses one or more protective schemes to evaluate the likely validity of the potential edge before utilizing the potential edge in the interpolation process. Through this approach, the processing effort needed to identify a potential edge can be reduced while controlling the risk that an invalid edge does not result in an inaccurate pixel value for the estimated pixel, which could introduce undesirable visual artifacts into the display of the corresponding image.

As noted above, the modules of the video processing device 100 of FIGS. 1-3 can be implemented as hardware. However, in addition to hardware implementations adapted to perform the functionality in accordance with one of the embodiments of the present disclosure, such modules may also be embodied in one or more processors configured to execute instructions in software disposed, for example, in a computer usable (e.g., readable) medium configured to store the software (e.g., a computer readable program code). The program code causes the enablement of embodiments of the present invention, including the following embodiments: (i) the functions of the devices and methods disclosed herein (such as devices and methods upscaling/deinterlacing video); (ii) the fabrication of the devices and methods disclosed herein (such as the fabrication of devices that are enabled to upscale or deinterlace video); or (iii) a combination of the functions and fabrication of the devices and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a digital, optical, or analog-based medium). It is understood that the functions accomplished and/or structure provided by the systems and techniques described above can be represented in a core (such as a GPU core) that is embodied in program code and may be transformed to hardware as part of the production of integrated circuits.

Figure 4:
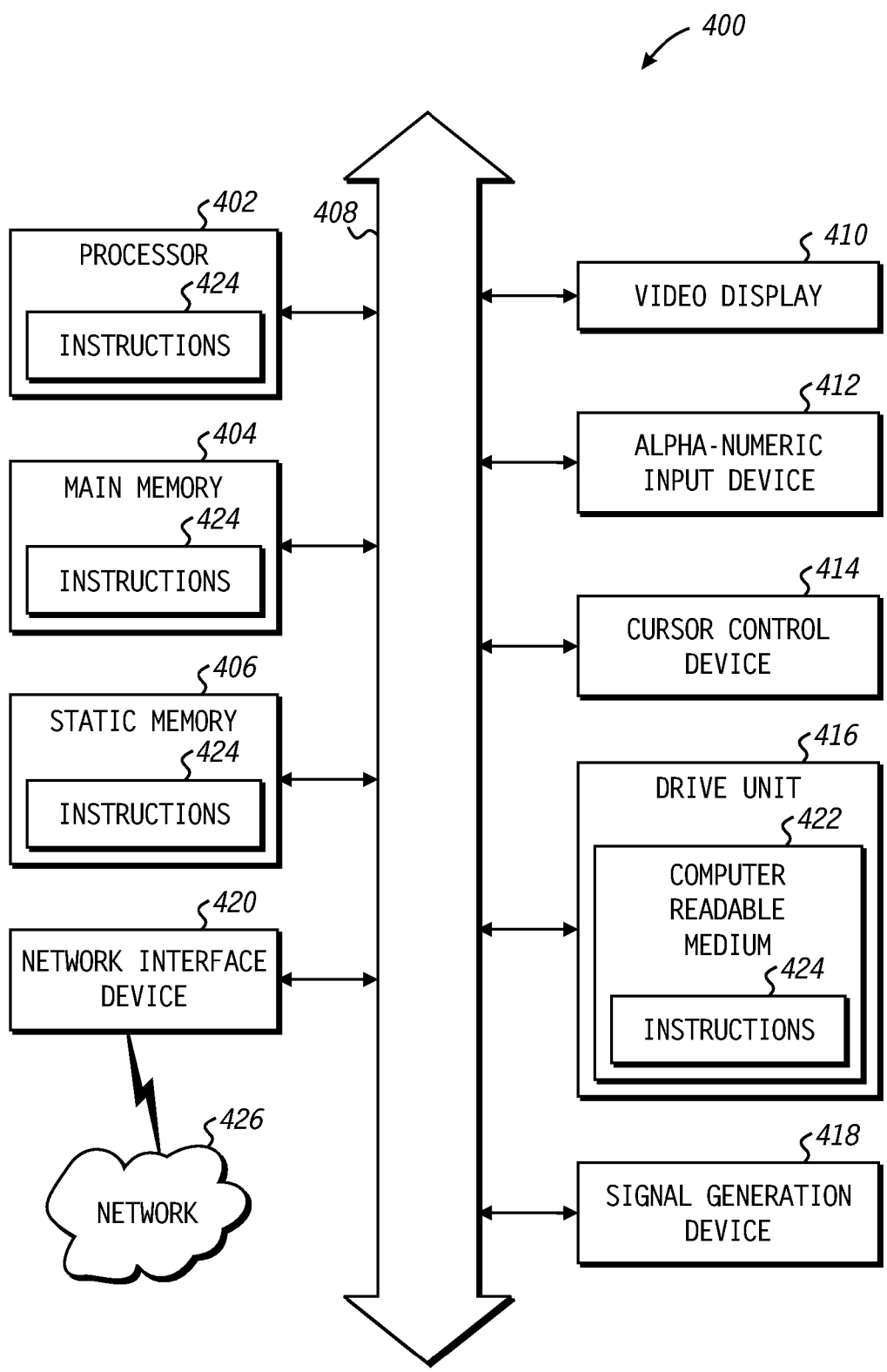
FIG. 4 is a diagram illustrating an example processor device for implementing the video processing device of FIG. 1 in accordance with at least one embodiment of the present disclosure.

FIG. 4 illustrates a processor device 400 in accordance with at least one embodiment of the present disclosure. The processor device 400 can include a set of instructions that can be executed to manipulate the processor device 400 to perform any one or more of the methods or functions disclosed herein. The processor device 400 may operate as a standalone device or may be connected, e.g., using a network, to other processor devices or peripheral devices.

In a networked deployment, the processor device may operate in the capacity of a server or as a client user computer in a server-client user network environment, or as a peer processor device in a peer-to-peer (or distributed) network environment. The processor device 400 can also be implemented as or incorporated into, for example, a portable display device. Further, while a single processor device 400 is illustrated, the term "system" shall also be taken to include any collection of systems or sub-systems that individually or jointly execute a set, or multiple sets, of instructions to perform one or more computer functions.

The processor device 400 may include a processor 402, e.g., a central processing unit (CPU), a graphics processing unit (GPU), or both. Moreover, the processor device 400 can include a main memory 404 and a static memory 406 that can communicate with each other via a bus 408. As shown, the processor device 400 may further include a video display unit 410, such as a liquid crystal display (LCD), an organic light emitting diode (OLED), a flat panel display, a solid state display, or a cathode ray tube (CRT). Additionally, the processor device 400 may include an input device 412, such as a keyboard, and a cursor control device 414, such as a mouse. The processor device 400 can also include a disk drive unit 416, a signal generation device 418, such as a speaker, and a network interface device 420.

In a particular embodiment, as depicted in FIG. 4, the disk drive unit 416 may include a computer readable storage device 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the processor device 400. The main memory 404 and the processor 402 also may include computer readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processor devices. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented, in whole or in part, by software programs executable by a processor device. The present disclosure contemplates a computer readable storage device that includes instructions or receives and provides instructions for execution responsive to a propagated signal, so that a device connected to a network can communicate voice, video or data over the network 426. Further, the instructions 424 may be transmitted or received over the network 426 via the network interface device 420.

In one embodiment, rather than being software instructions that directly implement the functionality described herein, the instructions 424 instead can implement design instructions representative of a hardware implementation of the above-described functionality that are then synthesized to determine the electrical and electronic design for a processing device that implements the above-described invention. To illustrate, these hardware-design instructions can include register transfer level (RTL) instructions, Verilog instructions, and the like.

While the computer readable storage device is shown to be a single storage device, the term "computer readable storage device" includes a single storage device or multiple storage devices, such as a centralized or distributed database, and/or associated caches and servers that store one or more sets of instructions. The term "computer readable storage device" shall also include any storage device that is capable of storing a set of instructions for execution by a processor or that cause a processor device to perform any one or more of the methods or operations disclosed herein.

In a particular embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A video processing device for determining a pixel value for a select pixel of a select line of a video frame, the video processing device comprising:
   an input to receive pixel values for a set of pixels of a pixel window, the pixel window comprising a plurality of lines of the video frame that encompasses the select pixel;
   a first filter module to apply a filter matrix to pixel values of a first set of lines of the plurality of lines to generate a first set of filter result values;
   a second filter module to apply the filter matrix to pixel values of a second set of lines of the plurality of lines to generate a second set of filter result values, the second set of lines and the first set of lines offset by at least one line and overlapping by at least one line; and a correlator module to identify an angle of a potential edge in proximity to the select pixel based on a cross-correlation of the first set of filter result values and the second set of filter result values.

2. The video processing device of claim 1, further comprising:
an interpolator module to generate a value representative of the pixel value for the select pixel based on an interpolation between pixel values of at least two pixels of the pixel window that are selected based on the angle of the potential edge.

3. The video processing device of claim 1, wherein the correlator module identifies the angle of the potential edge by:
cross-correlating the first set of filter result values and the second set of filter result values to generate a set of correlation result values;
determining the highest correlation result value of a first subset of the set of correlation result values and an index of the highest correlation result value of the first subset within the set of correlation result values;
determining the highest correlation result value of a second subset of the set of correlation result values and an index of the highest correlation result value of the second subset within the set of correlation result values; and
determining the angle of the potential edge based on the index of the greater of the highest correlation result value of the first subset and the highest correlation result value of the second subset.

4. The video processing device of claim 3, further comprising:
a variance module to determine a variance among pixel values of a subset of pixels of the pixel window in proximity to the select pixel;
a threshold selector module to determine a select threshold weight value from a plurality of threshold weight values based on at least one of: the highest correlation result value of the first subset; the highest correlation result value of the second subset; and an index of the highest correlation result value of the set of correlation result values;
a weighting module to weight the variance based on the select threshold weight value to generate a weighted variance;
a selector module to determine whether the potential edge is a valid edge based on the weighted variance; and
an interpolator module to, in response to the selector module determining the potential edge is a valid edge, generate a first estimated pixel value for the select pixel based on an interpolation between pixel values of at least two pixels of the pixel window selected based on the angle of the potential edge, and, in response to the selector module determining the potential edge is not a valid edge, generate the first estimated pixel value for the select pixel based on a vertical interpolation between one or more pixel values of pixels located above the select pixel and one or more pixel values of pixels located below the select pixel.

5. The video processing device of claim 4, further comprising:
a vertical difference module to determine a vertical difference value based on differences between pixel values of one or more pixels located above the select pixel and pixel values of one or more pixels located below the select pixel;
a pick difference module to determine an edge difference value based on differences between pixel values of at least two pixels of the pixel window selected based on the angle of the potential edge;
an edge measure module to determine a edge measure value representative of a difference between the vertical difference value and the edge difference value; and
wherein the selector module is to determine whether the potential edge is a valid edge further based on the edge measure value.

6. The video processing device of claim 4, further comprising:
a median filter module to:
receive a plurality of values, the plurality of values including one of the first estimated pixel value or a representation of the first estimated value, and at least one of: a pixel value of a pixel located directly above the select pixel; a pixel value of a pixel located directly below the select pixel; a pixel value of a pixel from a previous field in a same location as the select pixel; and a pixel value of a pixel selected from the pixel window based on the angle of the potential edge; and
select as the pixel value for the select pixel the median value of the plurality of values.

7. The video processing device of claim 1, wherein:
the video processing device comprises a deinterlacer;
the select line comprises a line of a first field of the video frame; and
the plurality of lines comprises lines of a second field of the video frame.

8. The video processing device of claim 1, wherein:
the video processing device comprises a video scaler;
the plurality of lines comprises adjacent lines of an original video frame; and
the select line comprises a line of an upscaled video frame representative of the original video frame.

9. A method comprising:
receiving, at a video processing device, pixel values for a set of pixels of a pixel window, the pixel window comprising a plurality of lines of the video frame that encompasses the select pixel;
applying, using the video processing device, a filter matrix to pixel values of a first set of lines of the plurality of lines to generate a first set of filter result values;
applying, using the video processing device, the filter matrix to pixel values of a second set of lines of the plurality of lines to generate a second set of filter result values, the second set of lines and the first set of lines offset by at least one line and overlapping by at least one line; and
cross-correlating the first set of filter result values and the second set of filter result values using the video processing device to identify an angle of a potential edge in proximity to the select pixel.

10. The method of claim 9, further comprising:
interpolating between pixel values of at least two pixels of the pixel window selected based on the angle of the potential edge to generate a value representative of the pixel value for the select pixel.

11. The method of claim 9, wherein cross-correlating the first set of filter result values and the second set of filter result values to identify the angle of the potential edge comprises:
cross-correlating the first set of filter result values and the second set of filter result values to generate a set of correlation result values;
determining the highest correlation result value of a first subset of the set of correlation result values and an index of the highest correlation result value of the first subset within the set of correlation result values;

determining the highest correlation result value of a second subset of the set of correlation result values and an index of the highest correlation result value of the second subset within the set of correlation result values; and determining the angle of the potential edge based on the index of the greater of the highest correlation result value of the first subset and the highest correlation result value of the second subset.

12. The method of claim 11, further comprising:

determining a variance among pixel values of a subset of pixels of the pixel window in proximity to the select pixel;

determining a select threshold weight value from a plurality of threshold weight values based on at least one of: the highest correlation result value of the first subset; the highest correlation result value of the second subset; and an index of the highest correlation result value of the set of correlation result values;

weighting the variance based on the select threshold weight value to generate a weighted variance;

determining whether the potential edge is a valid edge based on the weighted variance;

in response to determining the potential edge is a valid edge, generating a first value representative of the pixel value for the select pixel based on an interpolation between pixel values of at least two pixels of the pixel window selected based on the angle of the potential edge; and in response to determining the potential edge is not a valid edge, generating a second value representative of the pixel value for the select pixel based on a vertical interpolation between one or more pixel values of pixels located above the select pixel and one or more pixel values of pixels located below the select pixel.

13. The method of claim 12, further comprising:

determining, using the video processing device, a vertical difference value based on differences between pixel values of one or more pixels located above the select pixel and pixel values of one or more pixels located below the select pixel;

determining, using the video processing device, an edge difference value based on differences between pixel values of at least two pixels of the pixel window selected based on the angle of the potential edge;

determining, using the video processing device, an edge measure value representative of a difference between the vertical difference value and the edge difference value; and wherein determining whether the potential edge is a valid edge comprises determining whether the potential edge is a valid edge further based on the edge measure value.

14. The method of claim 12, further comprising:

receiving, using the video processing device, a plurality of values, the plurality of values including one of the first estimated pixel value or a representation of the first estimated value, and at least one of: a pixel value of a pixel located directly above the select pixel; a pixel value of a pixel located directly below the select pixel; a pixel value of a pixel from a previous field in a same location as the select pixel; and a pixel value of a pixel selected from the pixel window based on the angle of the potential edge; and selecting as the pixel value for the select pixel the median value of the plurality of values.

15. The method of claim 9, wherein:

the video processing device comprises a deinterlacer;

the select line comprises a line of a first field of the video frame; and the plurality of lines comprises lines of a second field of the video frame.

16. The method of claim 9, wherein:

the video processing device comprises a video scaler;

the plurality of lines comprises adjacent lines of an original video frame; and the select line comprises a line of an upscaled video frame representative of the original video frame.

17. A video processing device for determining a pixel value for a select pixel of a select line of a video frame, the video processing device comprising:

an input to receive pixel values for a set of pixels of a pixel window, the pixel window comprising a plurality of lines that encompasses the select pixel;

an edge detection module to determine an angle of a potential edge in proximity to the select pixel based on a cross-correlation of a first set of filter result values and a second set of filter result values, the first set of filter result values generated from an application of a filter matrix to pixel values of a first set of lines of the plurality of lines and the second set of filter result values generated from an application of the filter matrix to pixel values of a second set of lines of the plurality of lines, the first set of lines and the second set of lines offset by at least one line and overlapping by at least one line;

a selector module to determine whether the potential edge is a valid edge based on the angle of the potential edge and one or more differences determined between pixel values of pixels in proximity to the select pixel; and an interpolator module to determine an estimated pixel value based on an interpolation between pixel values of at least two pixels of the pixel window that are selected based on the angle of the potential edge in response to the selector module determining the potential edge is a valid edge, and determine the estimated pixel value based on a vertical interpolation between one or more pixel values of pixels located above the select pixel and one or more pixel values of pixels located below the select pixel, wherein the pixel value of the select pixel is based on the estimated pixel value.

18. The video processing device of claim 17, further comprising:

a variance module to determine a variance among pixel values of a set of pixels of the pixel window in proximity to the select pixel;

a threshold selector to determine a select threshold weight value from a plurality of threshold weight values based on at least one of: the highest correlation result value of the first subset; the highest correlation result value of the second subset; and an index of the highest correlation result value of the set of correlation result values;

a weighting module to weight the variance used on the select threshold weight value to generate a weighted variance; and wherein the selector module determines whether the potential edge is a valid edge based on the weighted variance.

19. The video processing device of claim 17, wherein:

the video processing device comprises a deinterlacer;

the select line comprises a line of a first field of the video frame; and the plurality of lines comprises lines of a second field of the video frame.

20. The video processing device of claim 17, wherein:
the video processing device comprises a video scaler;
the plurality of lines comprises adjacent lines of an original video frame; and
the select line comprises a line of an upscaled video frame representative of the original video frame.

\* \* \* \* \*

UNITED STATES PATENT AND TRADEMARK OFFICE
CERTIFICATE OF CORRECTION

PATENT NO.       : 8,643,777 B2                                Page 1 of 1
APPLICATION NO.  : 12/567128
DATED            : February 4, 2014
INVENTOR(S)      : Bradley Arthur Wallace et al.

It is certified that error appears in the above-identified patent and that said Letters Patent is hereby corrected as shown below:

In the Claims

Column 18, Line 16, please change "an input to receive pixel values fora set of pixels of a pixej window" to --an input to receive pixel values for a set of pixels of a pixel window--

Column 18, Line 56, please change "a weighting module to weight the variance used on the select threshold weight value to generate a weighted variance; and" to --a weighting module to weight the variance based on the select threshold weight value to generate a weighted variance; and--

Signed and Sealed this
Sixteenth Day of June, 2015

Michelle K. Lee
*Director of the United States Patent and Trademark Office*